(12) United States Patent
Tanaka et al.

(10) Patent No.: US 8,025,012 B2
(45) Date of Patent: Sep. 27, 2011

(54) INFLATOR

(75) Inventors: Akimitsu Tanaka, Aichi-ken (JP); Junichi Asanuma, Aichi-ken (JP); Yuji Kuriyama, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 84 days.

(21) Appl. No.: 12/461,305

(22) Filed: Aug. 6, 2009

(65) Prior Publication Data

US 2010/0031844 A1   Feb. 11, 2010

(30) Foreign Application Priority Data

Aug. 7, 2008  (JP) .................................. 2008-204650

(51) Int. Cl.
*B60R 21/26*   (2011.01)

(52) U.S. Cl. ....................... 102/530; 280/741

(58) Field of Classification Search .................. 102/530, 102/531; 280/741
See application file for complete search history.

(56) References Cited

U.S. PATENT DOCUMENTS

| | | |
|---|---|---|
| 5,553,889 A | 9/1996 | Hamilton et al. |
| 5,602,361 A | 2/1997 | Hamilton et al. |
| 5,616,883 A | 4/1997 | Hamilton et al. |
| 5,623,116 A | 4/1997 | Hamilton et al. |
| 5,627,337 A | 5/1997 | Hamilton et al. |
| 5,630,618 A | 5/1997 | Hamilton et al. |
| 5,675,102 A | 10/1997 | Hamilton et al. |
| 5,679,915 A | 10/1997 | Hamilton et al. |
| 5,711,546 A | 1/1998 | Hamilton et al. |
| 5,778,509 A | 7/1998 | Hamilton et al. |
| 5,788,275 A | 8/1998 | Butt et al. |
| 5,821,448 A | 10/1998 | Hamilton et al. |
| 6,808,204 B1 * | 10/2004 | Katsuda et al. ............ 280/741 |
| 7,044,501 B2 * | 5/2006 | Yamazaki ................ 280/737 |
| 7,059,635 B2 * | 6/2006 | Ryobo et al. ............ 280/741 |
| 7,134,689 B2 | 11/2006 | Matsuda et al. |

* cited by examiner

*Primary Examiner* — James Bergin
(74) *Attorney, Agent, or Firm* — Posz Law Group, PLC

(57) ABSTRACT

An inflator according to this invention has a structure that an interior part of a housing is charged with a pressurized gas and a gas generating agent capable of generating a gas when combusted, wherein the pressurized gas formed only of an inert gas; a quantity of heat to be generated when the gas generating agent is combusted is set within a range of 6000 to 10000 J/g; and a molar ratio between the pressurized gas and the combustion gas generated by the combustion of the gas generating agent is set within a range of 20 to 40.

5 Claims, 1 Drawing Sheet ness of the vehicle itself and from the viewpoint of improvement in degree of freedom of placement position.

INFLATOR

BACKGROUND OF THE INVENTION

1. Field of the Invention

This invention relates to a hybrid type inflator having a structure that an interior part of a housing is charged with a pressurized gas and a gas generating agent capable of generating a gas when combusted.

2. Related Art

A hybrid type inflator has heretofore been used for expanding an air bag in an air bag device, wherein the air bag is expanded by allowing a combustion gas generated by combustion of a gas generating agent and a pressurized gas to flow into the air bag when actuated. In such conventional inflator, a mixture gas obtained by mixing oxygen and an inert gas is used as the pressurized gas, and a gas in which a quantity of heat to be generated during combustion is set to about 5000 J/g has been used as the gas generating agent (see JP-A-8-282427, for example).

Generally, in the hybrid type inflator, a combustion residue (mist) of the gas generating agent is generated simultaneously with the generation of the combustion gas due to the combustion of the gas generating agent at the time of actuation, and such mist is discharged to the outside of the inflator from a gas discharge opening of the inflator together with the expanding gas formed of the pressurized gas and the combustion gas. Since the flowage of the mist into the air bag is undesirable, it is preferable to suppress the generation of the mist as small as possible. Also, the inflator of the air bag device mounted on vehicles generally has a high output in order to ensure an occupant protection function, and it is desirable to suppress a weight and a size as small as possible from the viewpoint of achievement of a lighter weight of the vehicle itself and from the viewpoint of improvement in degree of freedom of placement position.

SUMMARY OF THE INVENTION

In the inflator of JP-A-8-282427, oxygen mixed in the pressurized gas is mixed as an oxidizing agent for promoting the combustion of the gas generating agent at the time of actuation and not used for expanding the air bag. The inventors noted a use of a gas generating agent of which combustion can be promoted in the absence of oxygen and further noted the fact that a use of a gas which is capable of generating a larger quantity of heat during combustion as the gas generating agent enables to ensure the same output even when a use mount of the gas generating agent is reduced, thereby conceiving the inflator of this invention.

This invention solves the above-described problems, and an object thereof is to provide an inflator that is suppressed in output reduction and reduced in size and is capable of suppressing mist generation.

An inflator according to this invention is a hybrid type inflator comprising a housing, a pressurized gas, and a gas generating agent capable of generating a gas when combusted, the pressurized gas and the gas generating agent being charged inside the housing, wherein:

the pressurized gas consists of an inert gas;

a quantity of heat to be generated when the gas generating agent is combusted is set within a range of 6000 to 10000 J/g; and a molar ratio between the pressurized gas and the combustion gas generated by the combustion of the gas generating agent is set within a range of 20 to 40.

Since the pressurized gas consists of an inert gas in the inflator of this invention, it is possible to downsize the housing by a volume of oxygen that has been charged together with the pressurized gas in the conventional example. Also, since the gas generating the large quantity of heat of 6000 to 10000 J/g during its combustion is used as the gas generating agent in the inflator of this invention, it is possible to ensure a higher pressure by heat expansion of the pressurized gas even when a content of the gas generating agent (an amount of the combustion gas generated by the combustion of the gas generating agent) is reduced to about 1/30 of the amount of the pressurized gas by molar ratio, thereby ensuring an output identical to that of the conventional example. That is, since it is possible to relatively reduce the content of the gas generating agent in the inflator of this invention, it is possible to downsize the housing by the volume of the amount of reduction in gas generating agent, and it is possible to reduce an amount of mist generated during combustion of the gas generating agent.

Therefore, in the inflator of this invention, it is possible to achieve downsizing while suppressing a reduction in output as well as to suppress generation of mist.

In the inflator of this invention, since it is possible to reduce the amount of mist which is blown into an air bag together with an expansion gas when the expansion gas is ejected into the air bag from a gas ejection opening provided in the inflator, it is unnecessary to consider capturing of the mist around the gas ejection opening, and it is possible to set a larger opening area for the gas ejection opening. Therefore, it is possible to change output characteristics of the expansion gas of the inflator when so required by changing the opening area of the gas ejection opening. For example, it is possible to rapidly eject a large amount of the expansion gas when the opening area of the gas ejection opening is increased, while it is possible to slowly eject the expansion gas when the opening area of the gas ejection openings is reduced. As described above, it is possible to easily change the output characteristics by changing the opening area of the gas ejection opening in the inflator of this invention.

DETAILED DESCRIPTION OF THE PREFERRED EMBODIMENTS

Figure 1:
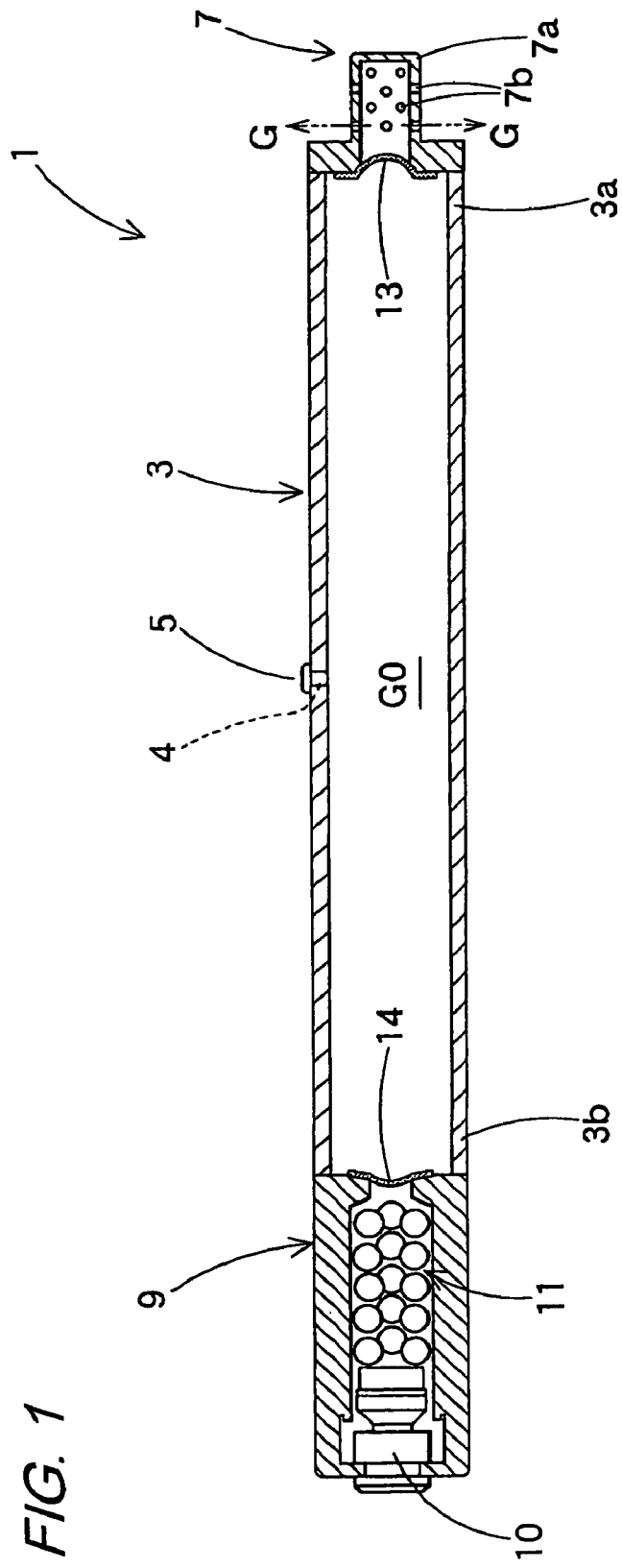
FIG. 1 is a schematic vertical sectional view showing an inflator which is one embodiment of this invention.

Hereinafter, one embodiment of this invention will be described based on the drawings. An inflator 1 of the embodiment is of a cylinder type having a substantially cylindrical outer shape as shown in FIG. 1 and is of a hybrid type having a structure that a pressurized gas G0 and a gas generating agent 11 capable of generating a gas during combustion are charged inside. The inflator 1 has a structure that an ejection opening metal part 7 is fixed to a front end 3a of a substantially cylindrical housing 3 whose interior part is charged with the pressurized gas, and that a squib opening metal part 9 retaining the gas generating agent 11 and a squib 10 for igniting the gas generating agent 11 is fixed to a rear end 3b of the housing 3. The ejection opening metal part 7 has a projected head part 7a that is provided with a plurality of gas ejection openings 7b.

The housing 3 is formed from a metal pipe made from a steel, and bursting plates 13 and 14 which are capable of bursting by generation of internal pressure increase or impact wave involved in ignition of the gas generating agent 11 are independently disposed at a boundary between the housing and the ejection opening metal part 7 and a boundary between the housing 3 and the squib opening metal part 9. A charging opening 4 to be used for charging the pressurized gas is provided at a predetermined position (at substantially the center in an axial direction in this embodiment) of the housing 3. The charging opening 4 is closed by a closing pin 5. The internal part of the housing 3 is charged with an inert gas that does not contain oxygen as the pressurized gas G0. As the inert gas, a nitrogen gas, a helium gas, an argon gas, a mixture gas thereof, and the like are usable. In this embodiment, specifically, an argon gas alone, a helium gas alone, or a mixture gas of argon gas and helium gas is used as the pressurized gas G0. In this embodiment, the pressurized gas G0 is charged inside the housing 3 at an internal pressure within the range of 35 to 70 MPa.

The squib 10 is provided in the squib opening metal part 9 at a position opposed to the bursting plate 14 provided in the housing 3. The squib 10 is housed inside the squib opening metal part 9 such that a front end thereof is inserted into the squib opening metal part 9, and that a rear end is exposed to the outside of the squib opening metal part 9 to be connected to a lead wire (not shown) for actuation signal input. In this embodiment, the squib 10 has a structure of housing an agent that is capable of generating a small amount of combustion gas inside thereof. The squib 10 is electrically connected to a control device of a vehicle when the inflator 1 is mounted on the vehicle as the air bag device and so operates as to cause combustion of the agent inside upon reception of the actuation signal from the control device, thereby causing combustion of the gas generating agent 11.

The gas generating agent 11 is charged between the squib 10 and the bursting plate 14 inside the squib opening metal part 9. The combustion gas generated from the gas generating agent 11 when the gas generating agent 11 is combusted is used together with the pressurized gas G0 for expansion of the air bag, and a quantity of heat generated during the combustion is set within a range of 6000 to 10000 J/g. It is difficult to achieve a desired output when the heat quantity is less than 6000 J/g due to the too low quantity of heat generated during the combustion and insufficient expansion of the pressurized gas G0. It is difficult to obtain the gas generating agent having a quantity of heat exceeding 10000 J/g.

In this embodiment, specifically, a fuel, an oxidizing agent, and a metal powder are appropriately mixed together with a binding agent, and the mixture is molded into a predetermined shape (ball-like shape in this embodiment) to be used as the gas generating agent 11. Examples of the fuel include a triadine derivative, a tetrazole derivative, a triazole derivative, a guanidine derivative, an azodicarbonamide derivative, a hydrazine derivative, and the like, and these fuels may be used alone or in combination of two or more. Examples of the oxidizing agent include strontium nitrate, potassium nitrate, ammonium nitrate, potassium perchlorate, copper oxide, iron oxide, basic copper nitrate, and the like, and these oxidizing agents may be used alone or in combination of two or more. Examples of the metal powder include boron and the like, and these metal powders may be used alone or in combination of two or more. The metal powder is added for the purpose of increasing the quantity of heat during combustion, and it is preferable to use boron in this embodiment since boron has high combustion heat and achieves a large quantity of heat by a small amount. Examples of the binding agent include a sodium salt of carboxymethyl cellulose, hydroxyethyl cellulose, hydroxypropyl cellulose, starch, polyvinyl alcohol, guar gum, microcrystalline cellulose, polyacrylamide, calcium stearate, and the like, and these binding agents may be used alone or in combination of two or more.

In the inflator 1 of this embodiment, the pressurized gas G0 and the gas generating agent 11 are charged inside so that a molar ratio (pressurized gas/combustion gas) between the pressurized gas and the combustion gas generated by the combustion of the gas generating agent 11 is within the range of 20 to 40. When the pressurized gas/combustion gas molar ratio is less than 20, since the charged amount of the gas generating agent 11 is too large, the inflator 1 becomes bulky and the mist to be generated during the combustion of the gas generating agent reaches to a considerable amount. In contrast, when the pressurized gas/combustion gas molar ratio exceeds 40, since the charged amount of the gas generating agent is too small, a required quantity of heat is not achieved, and a desired output is not achieved. Since the charged amount of the gas generating agent 11 with respect to the pressurized gas is disproportional to the quantity of heat generated by the gas generating agent 11, it is estimated that it possible to increase the pressurized gas/combustion gas molar ratio as a result of a reduction in charged amount of the gas generating agent 11 which is achieved by the use of the gas generating agent 11 having a large heat generation quantity.

When the actuation signal from the control device is inputted via the lead wire (not shown) in a state where the inflator 1 of this embodiment is mounted on a vehicle together with the air bag device, the squib 10 is actuated so that the gas generating agent 11 is combusted to generate the combustion gas. The generated combustion gas increases the internal pressure of the squib opening metal part 9 so that the bursting plate 14 bursts to allow the combustion gas to enter the housing 3. When the internal pressure of the housing 3 is increased due to heating of the pressurized gas G0 inside the housing 3 by the combustion gas, the bursting plate 13 bursts to allow the pressurized gas G0 and the combustion gas to flow as an expansion gas G to the outside of the inflator 1 from the gas ejection opening 7b provided at the ejection opening metal part 7; thereby expanding the air bag of the air bag device.

In the inflator 1 of this embodiment, since the pressurized gas G0 is formed from the inert gas that does not contain oxygen, it is possible to downsize the housing 3 by a volume of the oxygen that was charged together with the pressurized gas in the conventional example. Also, in the inflator 1 of this embodiment, since the gas that generates the large quantity of heat of 6000 to 10000 J/g during combustion is used as the gas generating agent 11, it is possible to ensure the higher pressure by causing heat expansion of the pressurized gas even when the content of the gas generating agent 11 (an amount of the combustion gas generated by the combustion of the gas generating agent 11) is reduced to about 1/30 of the amount of the pressurized gas G0, thereby ensuring the output similar to that of the conventional example. That is, since it is possible to relatively reduce the content of the gas generating agent 11 in the inflator 1 of this embodiment, it is possible to downsize the housing 3 by a volume of the reduction in gas generating agent 11 as well as to reduce the amount of the mist to be generated during the combustion of the gas generating agent 11.

Consequently, the inflator 1 of this embodiment is suppressed in output reduction, compact-sized, and suppressed in mist generation.

In the inflator 1 of this embodiment, since it is possible to reduce the amount of mist ejected into the air bag together with the expansion gas G when the expansion gas G is ejected into the air bag from the gas ejection opening 7b provided on the inflator 1, it is unnecessary to consider capturing of the mist around the gas ejection opening 7b, and it is possible to set a larger opening area for the gas ejection opening 7b. Therefore, it is possible to appropriately change output characteristics of the expansion gas of the inflator 1 by changing the opening area of the gas ejection opening 7b. For example, it is possible to rapidly eject a large amount of the expansion gas by increasing the opening area of the gas ejection opening 7b, and it is possible to slowly eject a small amount of the expansion gas by reducing the opening area of the gas ejection opening 7b. In the inflator 1 of this embodiment, it is possible to easily change the output characteristics by changing the opening area of the gas ejection opening 7b as described above.

Results of measurements of outputs at the time of actuation of a plurality of inflators satisfying requirements of this invention and a plurality of inflators as comparative examples are shown in Tables 1 and 2. The output the time of actuation was measured by a tank combustion test, wherein each of the inflators was fixed in a stainless steel tank having an inner volume of 28.3 L to measure a maximum tank inner pressure. Amounts of chemical substances of the pressure gases used in the inflators of Examples A to C and inflators of comparative Examples A to C are substantially the same, and only the gas generating agents were varied. The gas generating agent having the composition (quantity of generated heat: 6300 J/g; amount of generated combustion gas: 0.014 mol/g) shown in Table 3 was used as the gas generating agent in the inflators of Examples A to C, and the gas generating agent having the composition (quantity of generated heat: 3200 J/g; amount of generated combustion gas: 0.023 mol/g) shown in Table 4 is used in the inflators of Comparative Examples A to C. Also, silicon nitride (see Table 4) used in the gas generating agent of the inflators of Comparative Examples A to C is a slag forming agent for forming a slag for suppressing mist generation during combustion. In each of Examples A to C and Comparative Examples A to C, a mixture gas obtained by mixing argon and helium in a molar ratio of Ar/He=0.94/0.06 was used as the pressurized gas.

TABLE 1

|  | Pressurized Gas Mass (g) | Substance Quantity of Pressurized Gas (mol) | Gas Generating Agent Mass (g) | Substance Quantity of Combustion Gas (mol) | Pressurized Gas/ Combustion Gas (molar ratio) | Tank Pressure (kPa) |
| --- | --- | --- | --- | --- | --- | --- |
| Ex. A | 35.0 | 0.91 | 2.89 | 0.042 | 21.8 | 210 |
| Ex. B | 57.4 | 1.49 | 3.17 | 0.046 | 32.7 | 250 |
| Ex. C | 64.3 | 1.67 | 3.55 | 0.051 | 32.7 | 280 |

TABLE 2

|  | Pressurized Gas Mass (g) | Substance Quantity of Pressurized Gas (mol) | Gas Generating Agent Mass (g) | Substance Quantity of Combustion Gas (mol) | Pressurized Gas/ Combustion Gas (molar ratio) | Tank Pressure (kPa) |
| --- | --- | --- | --- | --- | --- | --- |
| Comp. Ex. A | 35.0 | 0.93 | 5.35 | 0.123 | 7.6 | 210 |
| Comp. Ex. B | 57.4 | 1.52 | 5.73 | 0.131 | 11.6 | 250 |
| Comp. Ex. C | 64.3 | 1.70 | 6.42 | 0.147 | 11.6 | 280 |

TABLE 3

|  | Content (wt %) |
| --- | --- |
| 5-aminotetrazole (fuel) | 11.0 |
| Boron (metal powder) | 12.0 |
| Synthetic Hydrotalcite (binding agent) | 2.0 |
| Hydroxypropyl Cellulose (binding agent) | 1.0 |
| Polyvinyl Pyrrolidone (binding agent) | 4.0 |
| Potassium Nitrate (oxidizing agent) | 70.0 |

TABLE 4

|  | Content (wt %) |
| --- | --- |
| 5-aminotetrazole (fuel) | 33.0 |
| Synthetic Hydrotalcite (binding agent) | 4.0 |
| Silicon Nitride | 3.0 |
| Strontium Nitrate (oxidizing agent) | 60.0 |

As shown in Tables 1 and 2, in each of the inflators of the Examples A to C, the amount of the pressurized gas is substantially the same as that of the corresponding one of the inflators of Comparative Examples A to C, while the amount of the gas generating agent is reduced as compared to that of the corresponding one of the inflators of Comparative Examples A to C. More specifically, the substance quantity of the combustion gas per unit weight of the gas generating agent of each of the inflators of Examples A to C is set to about ⅔ of the gas generating agent used in each of the inflators of Comparative Examples A to C, and the weight of the gas generating agent charged in the inflator is set to the smaller value as compared to the Comparative Examples A to C. However, since the quantity of generated heat of the gas generating agent used in the inflators of Examples A to C is set to the value which is about twice that of the gas generating agent used in Comparative Examples A to C, the inflators are suppressed in output reduction as compare to the inflators of Comparative Examples A to C, while achieving the tank pressures each of which is substantially the same as that of corresponding one of Comparative Examples A to C. More specifically, the gas generating agent used in the inflators of Examples A to C is different from the gas generating agent used in the inflators of Comparative Examples A to C in that the content of the fuel is reduced and that boron is contained as the metal powder. From such points, it is estimated that boron contributes to the increase in quantity of generated heat during combustion of the gas generating agent.

In the inflators of Examples A to C, the amount of the gas generating agent (substance quantity of the combustion gas generated during combustion) is reduced to about ½ to ⅔ of the inflators of Comparative Examples A to C. Therefore, since it is possible to reduce the amount of the gas generating agent in the inflators of Examples A to C as compared to the inflators of Comparative Examples A to C, it is possible to downsize the housing by the volume of the reduction in gas generating agent as well as to reduce an amount of mist to be generated during combustion of the gas generating agent. It is possible to downsize an outer shape of the inflators of Examples A to C by a volume of about 10% of an outer shape of the inflators of Comparative Examples A to C.

What is claimed is:

1. A hybrid inflator for injecting expanding gas formed of a pressurized gas and a combustible gas, the hybrid inflator comprising a housing made of metal including a chamber in which the pressurized gas is charged, a gas injection opening, a gas generating agent containing metal powder capable of generating the gas when combusted and a squib,
   wherein a first side of the chamber is closed with a first bursting plate facing the gas generating agent and the squib, and a second side of the chamber is closed with a second bursting plate facing the gas ejection opening;
   the pressurized gas consists of an inert gas;
   a quantity of heat to be generated when the gas generating agent is combusted is set within a range of 6000 to 10000 J/g; and
   a molar ratio between the pressurized gas and the combustion gas generated by the combustion of the gas generating agent is set within a range of 20 to 40.

2. The hybrid inflator according to claim 1, wherein the metal powder includes boron.

3. The hybrid inflator according to claim 1, wherein a fuel, an oxidizing agent and the metal powder are mixed together with a binding agent, and molded into a predetermined shape to be used as the gas generating agent.

4. The hybrid inflator according to claim 3, wherein the binding agent includes a cellulosic material.

5. The hybrid inflator according to claim 3, wherein the binding agent is water-soluble.

* * * * *